United States Patent [19]

De La Cruz

[11] Patent Number: 5,490,707

[45] Date of Patent: Feb. 13, 1996

[54] EXTERIOR AUTOMOBILE SUNSHIELD

[76] Inventor: Jose R. De La Cruz, 460 Lakeshire Dr., Daly City, Calif. 94015

[21] Appl. No.: 443,364

[22] Filed: May 17, 1995

[51] Int. Cl.⁶ .................................................. B60J 11/00
[52] U.S. Cl. ......................... 296/95.1; 296/136; 150/166
[58] Field of Search ............................... 296/95.1, 136; 160/370.21; 150/166, 168

[56] References Cited

U.S. PATENT DOCUMENTS

| | | | |
|---|---|---|---|
| 2,599,066 | 6/1952 | Osborn | 160/368 |
| 2,646,118 | 7/1953 | Berty | 296/95.1 |
| 2,874,709 | 2/1959 | Cohen et al. | 296/95.1 |
| 2,944,601 | 7/1960 | Compson | 296/95.1 |
| 3,184,264 | 5/1965 | Ealey et al. | 296/95.1 |
| 3,338,293 | 8/1967 | Hohmann | 296/95.1 |
| 3,992,053 | 11/1976 | Hrytzak et al. | 296/136 |
| 4,109,957 | 8/1978 | Polizzi | 296/95.1 |
| 4,209,197 | 6/1980 | Fisher | 296/216 |
| 4,355,839 | 10/1982 | Rosen | 296/136 |
| 4,596,418 | 6/1986 | Koh | 296/136 |
| 4,635,993 | 1/1987 | Hooper et al. | 296/95 C |
| 4,821,785 | 4/1989 | Rolan | 150/166 |
| 4,842,324 | 6/1989 | Carden | 296/136 |
| 4,850,635 | 7/1989 | Lindell | 296/136 |
| 4,867,216 | 9/1989 | McKee | 150/166 |
| 4,940,276 | 7/1990 | Madison | 296/136 |
| 4,952,007 | 8/1990 | Shahrokh | 296/95.1 |
| 4,964,667 | 10/1990 | Reis et al. | 296/95.1 |
| 4,972,892 | 11/1990 | Yeh | 150/166 |
| 5,014,758 | 5/1991 | Stinson | 150/168 |
| 5,029,933 | 7/1991 | Gillem | 296/136 |
| 5,123,468 | 6/1992 | Mater, Jr. | 150/168 |
| 5,176,421 | 1/1993 | Fasiska | 296/136 |
| 5,197,503 | 3/1993 | Chen | 135/88 |
| 5,241,977 | 9/1993 | Flores et al. | 135/88 |
| 5,242,205 | 9/1993 | Garner | 296/136 |
| 5,244,245 | 9/1993 | Kashino | 296/136 |
| 5,292,167 | 3/1994 | Hellman | 296/95.1 |
| 5,328,230 | 7/1994 | Curchod | 296/136 |
| 5,343,915 | 9/1994 | Newsome | 296/136 |
| 5,388,883 | 2/1995 | Yang | 296/136 |
| 5,409,286 | 4/1995 | Huang | 296/136 |

FOREIGN PATENT DOCUMENTS

| | | | |
|---|---|---|---|
| 2672851 | 8/1992 | France | 296/136 |
| 5-294146 | 11/1993 | Japan | 296/136 |

Primary Examiner—Dean Kramer
Attorney, Agent, or Firm—Albert J. Dalhuisen

[57] ABSTRACT

The present invention provides for automobile sunshields covering the roof and window areas. The sunshield has small apertures to release wind pressure from the inside of the sunshield. The sunshield is fastened onto the automobile body with suction cups. A security band and lock secure the sunshield to the automobile.

5 Claims, 2 Drawing Sheets

EXTERIOR AUTOMOBILE SUNSHIELD

FIELD OF THE INVENTION

The present invention relates to devices for protecting objects from sunlight. More particularly the invention relates to automobile covers. Still more particularly, the invention relates to sunshield covers suitable for fitting over the roof and window areas of automobiles.

BACKGROUND OF THE INVENTION

The interior of an automobile heats up considerable when parked in the sun. The increased temperature of the car interior and particularly the seats results in major discomfort to the user upon entering the automobile. Also, heat build up inside the car can damage the car's interior such as plastic and fabric components. Heat can damage any heat sensitive objects placed inside the automobile such as food or photographic film. The sun's ultraviolet light damages plastic parts such as the dashboard and causes fading of fabric or other seat covering materials.

Various covers have been devised to protect automobiles. For example, U.S. Pat. No. 5,176,421 (Fasiska, 1993) discloses an automobile cover system which covers substantially all outside surfaces except the bottom. U.S. Pat. No. 5,029,933 (Gillem, 1991) discloses a car cover consisting of a main panel and side panels, to substantially cover the roof and window areas. U.S. Pat. No. 4,972,892 (Yeh, 1990) discloses a vehicle cover and method of making same. The '892 cover comprises adjacent panels wherein the four side panels are joined to a roof panel. When the cover is placed on the roof and window areas of a vehicle the side panels overlap at the four corners. The overlapping corners are fastened onto one another. Fasteners are locked around the outside mirrors. Yeh provides magnets to provide a holding force to withstand wind. U.S. Pat. No. 4,940,276 (Madison, 1990) discloses a car cover consisting of a flat pliable material for covering the roof and window areas. Slits allow opening of the car doors without removal of the cover. The cover is locked onto the vehicle by means of straps which lock onto the doors and the trunk lid.

U.S. Pat. No. 4,867,216 (McKee, 1989) discloses a sun and snow vehicle cover for covering the roof and window areas. The flexible cover material has a plurality of raised portions to prevent the material from collapsing between the raised portions. Drainage ports are provided near the peripheral edge. Preferably, magnets secure the cover to the car. Straps anchor the cover to opposite sides of the vehicle. U.S. Pat. No. 4,842,324 (Carden, 1989) discloses a cover consisting of a flexible insulating material for the cab portion of an automobile. The cover is attached to the door, trunk and windshield wipers and has a slit to provide access to the vehicle. U.S. Pat. No. 4,209,197 (Fischer, 1980) discloses weather protection systems for road vehicles. The cover comprises two protector pans, each extending over one half of the cab such that the roof and window areas are completely covered when the parts are joined. Magnets secure the bottom edge of the cover to the car. The bottom edges can also be secured to the door handles and wheel apertures by means of rubber cords.

The '892, '216 and '197 patents utilize magnets to assist in fastening the cover to the car. Magnets however, are not effective for car bodies made of plastic, stainless steel or aluminum. Also, magnets do not provide attachment to glass surfaces such as windows.

It is believed that a partial sunshield covering the roof and window areas is more susceptible to wind action than a full size sunshield covering the entire automobile, such as, for example, the '421 Fasiska cover. Wind which blows against the side of the automobile is deflected underneath the partial sunshield, while this generally does not occur when a full size sunshield is used. However, partial sunshields are generally preferred over full size sunshields since partial sunshields are less expensive and less cumbersome to handle than full size sunshields.

Known sunshields for covering the roof and window areas do not provide optimal wind resistance. For example, the Gillem '933 and Madison '276 covers are not fitted snugly over the roof and window areas, thus allowing wind access underneath the cover. The Yeh '892 cover is believed to allow significant wind access through the overlapping corners. The McKee '216, Carden '324 and Fischer '197 covers can be snugly fitted but these covers have no provision for quickly relieving wind pressure from underneath the respective covers. Covers which allow wind access and covers which have no provision for quickly relieving wind pressure from underneath the cover can be blown off the automobile or damaged during windy weather conditions.

Accordingly, the need exists for an automobile sunshield covering the roof and window areas having improved wind resistance.

A variety of theft deterrent systems are used with car covers as exemplified in the above referenced patents. For example, the Yeh '892 patent teaches a system of locking a cover onto the vehicle's outside mirrors, the Madison '276 patent teaches the use of fastening straps which lock between the doors and the vehicle body, and the joint between the trunk lid and the vehicle body, the Carden '324 patent theft deterrent system includes a rear tubular member on the bottom of the back portion of the cover for insertion between the trunk lid and the car body.

Generally, the known theft deterrent systems of car covers rely on cover appendages such as additionally straps or tubular members which are secured to the car. Upon severing the appendages, a thief still has a useful cover since the remaining cover will provide sunlight protection to the roof and window areas. The straps and other appendages are thus thought to be relatively ineffective theft deterrents. Also, theft deterrent systems relying on locking onto the trunk are not effective for automobiles without a trunk, such as, for example, station wagons, vans, minibuses and trucks.

Accordingly, the need exists for an automobile sunshield covering the roof and window areas having improved theft deterrence.

SUMMARY OF THE INVENTION

The present invention provides novel exterior sunshields suitable for fitting over the roof and window areas of automobiles, wherein the sunshields are constructed of breathable material.

In one embodiment, the current invention provides a sunshield having apertures for releasing wind pressure from inside the sunshield and having suction cups for fastening the sunshield to an automobile.

In another embodiment, the present invention provides a sunshield having apertures and suction cups, additionally having a locking device to lock the sunshield to the automobile.

DETAILED DESCRIPTION OF THE INVENTION

While describing the invention and its embodiments, certain terminology will be utilized for the sake of clarity. It is intended that such terminology include not only the recited embodiments but all technical equivalents which perform substantially the same function, in substantially the same manner to achieve substantially the same result.

It will be understood that automobiles as defined herein include passenger cars, station wagons, vans, minibuses and trucks.

Figure 1:
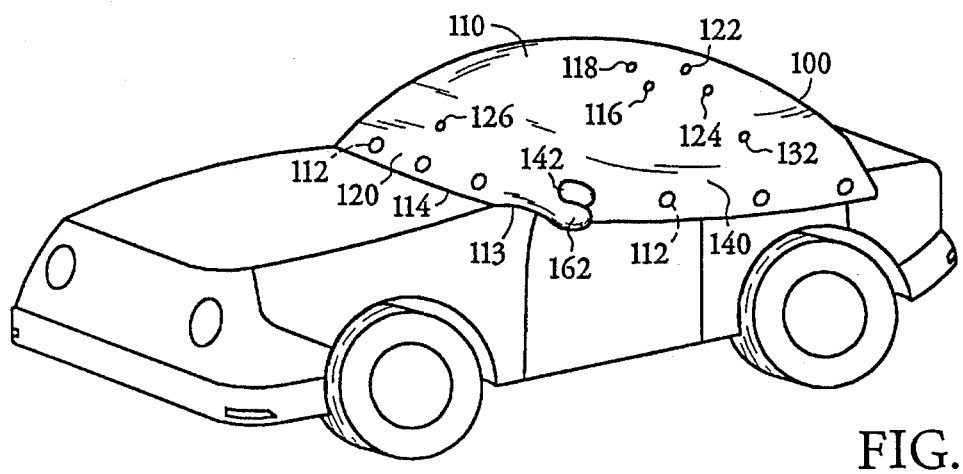
FIG. 1 is a schematic perspective view illustrating a sunshield of the present invention.

One embodiment of the present invention is illustrated in FIG. 1 showing automobile sunshield 100 fully installed on an automobile. The sunshield 100 is preferably constructed of a lightweight flexible, breathable material such as a fabric, for example nylon or cotton. Suitable materials include natural and synthetic materials as well as blends of synthetic and natural materials. Sunshield 100 is adapted to cover the automobile roof and windows areas, conforming substantially to the size and shape of these exterior portions of the automobile. The breathable characteristics of these materials aid in releasing wind pressure from underneath the sunshield. Sunshields of the present invention are fabricated by commonly used methods such as sewing.

Figure 2:
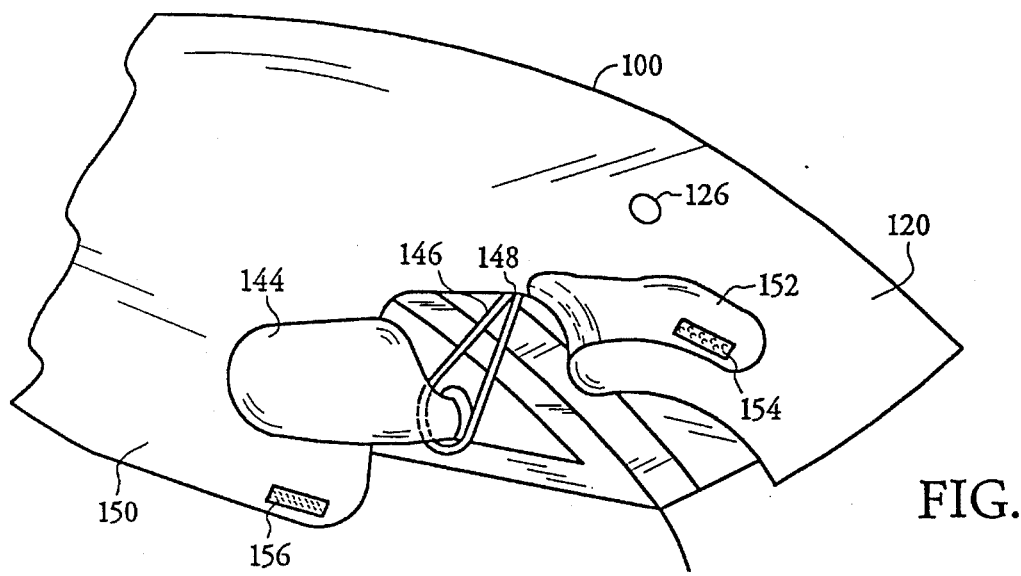
FIG. 2 is a partial schematic perspective view illustrating the placement of the sunshield of FIG. 1 around an outside rearview mirror.

Sunshield 100 (FIG. 1) includes a roof portion 110 which is adapted for covering the automobile roof. Similarly, windshield portion 120 covers the automobile windshield, rear portion 130 (not shown) covers the rear window, first side portion 140 covers the windows of the first side of the automobile and second side portion 150 (partly shown in FIG. 2) covers the windows of the second side of the automobile. The sunshield is held in place by means of conventional suction cups 112 which are attached to the inside of sunshield 100 in close proximity to sunshield perimeter 113. Preferably, the suction cups are spaced approximately equidistant from each other. Suction cups ranging in diameter from about 2 inches to about 3 inches are suitable, while 2½ inches is the preferred diameter.

Apertures are provided in sunshield 100 to relieve wind pressure from the inside of the sunshield since it was found that even a moderate wind was sufficient to blow the cover off the automobile even when suction cups are used and even though sunshield 100 does not provide significant gaps or slits which would facilitate wind entry underneath the sunshield. Aperture size and position are selected to relieve wind pressure without facilitating wind entry underneath the cover, and without forming hot spots inside the automobile or on the automobile's exterior. Tests showed that each sunshield portion should have at least one aperture. However, it was found advantageous to have four apertures in the roof portion. The apertures are particularly effective when positioned in the central area of each sunshield portion. A suitable aperture diameter was found to be approximately ⅜ inch. The operable diameter of apertures ranges from about ¼ inch to about 7/16 inch. Apertures which are too small are not effective for relieving wind pressure underneath the cover, while large apertures facilitate wind entry underneath the cover and are likely to create hot spots.

Accordingly with reference to FIG. 1, apertures having a diameter of approximately ⅜ inch are positioned in the central area of each portion as follows. Apertures 116, 118, 122 and 124 are positioned in the roof portion 110, aperture 126 in windshield portion 120, aperture 128 (not shown) in rear portion 130, aperture 132 in first side portion 140 and aperture 134 (not shown) in second side portion 150. Preferably, the four roof portion apertures are positioned within a circular area having a diameter of approximately 30 inches and having a center which is approximately equidistant from: (1) the windshield portion perimeter, (2) the rear portion perimeter, (3) the first side portion perimeter and (4) the second side portion perimeter. Preferably, the aperture in each of the windshield portion, the rear portion, the first side portion and the second side portion is positioned at least 10 inches from the sunshield perimeter. More preferably, the aperture in each of the windshield portion, the rear portion, the first side portion and the second side portion is spaced at least 12 inches from the perimeter of the respective portion.

Automobiles are commonly equipped with one or two outside rearview mirrors such as first outside mirror 142 shown in FIG. 1. A second outside mirror 144 is shown in more detail in FIG. 2 which also depicts the positioning of second side portion 150 relative to mirror 144. Sunshield 100 is shaped to fit around mirror 144. A flap 152 is folded back when the sunshield is fitted on the automobile in order to place the appropriate section of portion 150 around mirror 144. An elastic strap 146, attached to portion 150 at position 148, is fitted around mirror 144 in the manner shown in FIG. 2. Elastic strap 146 aids in installing the sunshield since the strap holds the adjacent section of the sunshield in place prior to fastening the suction cups to the automobile exterior.

Flap 152 is then fitted below mirror 144, fastening the proximal section of flap 152 onto portion 150 using fasteners 154 and 156. Fasteners 154 and 156 include conventional fasteners such as hook-and-loop fasteners. Once flap 152 is fitted snugly around mirror 144, and is attached to second side portion 150 there is only minimal wind access to the inside of sunshield 100 around mirror 144. First side portion 140 is similarly fitted around mirror 142 (FIG. 1) using flap 162 and elastic strap 166 (not shown). Elastic straps 146 and 166 provide an additional holding means to securely hold sunshield 100 on an automobile.

Figure 3:
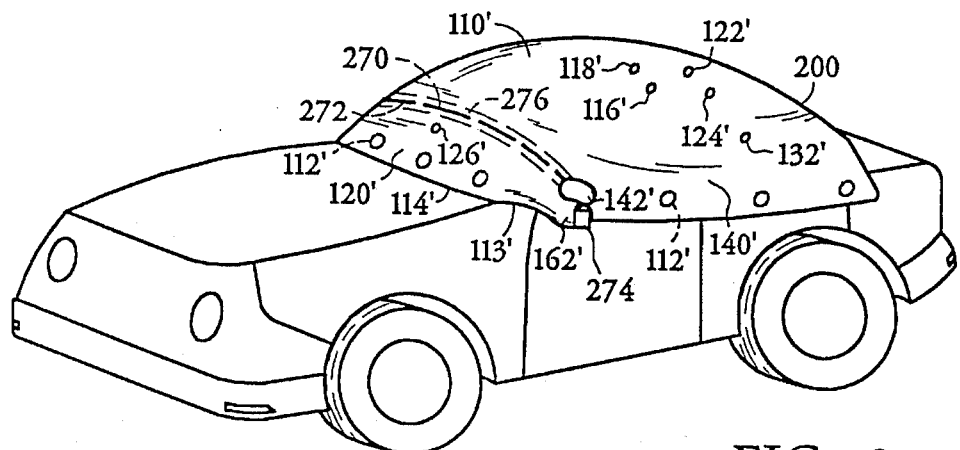
FIG. 3 is a schematic perspective view of an alternate sunshield of the current invention using a locking device.

FIG. 3 illustrates an alternate embodiment of the present invention. Sunshield 200 is devised to add theft deterrent features to sunshield 100. Accordingly, sunshield 200 includes portions 110', 120', 130' (not shown), 140' and 150'; apertures 116', 118', 122', 124', 126', 128' (not shown), 132' and 136' (not shown); suction cups 112'; flaps 152' and 162'; elastic straps 146' and 166' (not shown) and perimeter 113'. Sunshield 200 is provided with a locking device 270 comprising a security band 272 and a conventional lock 274. Security band 272 as defined herein includes flexible metal bands, metal wires, metal cables and metal chains. Preferably, security band 272 has a non-abrasive coating to prevent damage to the automobile exterior coating. Lock 274 includes padlocks. Preferably, lock 274 has a non-abrasive coating or a fabric cover.

As shown in FIG. 3, security band 272 is slidably contained within a sleeve 276 which is attached to the inside surface of sunshield 200. Sleeve 276 has a first end adjacent the sunshield section which is adapted for fitting around a first outside mirror 142', and a second end adjacent the sunshield section which is adapted for fitting around a second outside mirror 144'. Sleeve 276 has a midpoint approximately equidistant between the first end and the second end. Sleeve 276 is positioned such that its midpoint is positioned at least 6 inches from the sunshield perimeter or at least 10 inches from windshield perimeter 114' of windshield portion 120'. For example, sleeve 276 can be positioned such that the midpoint is positioned along the inside of roof portion 110' or the midpoint can be positioned inside windshield portion 120'.

Figure 4:
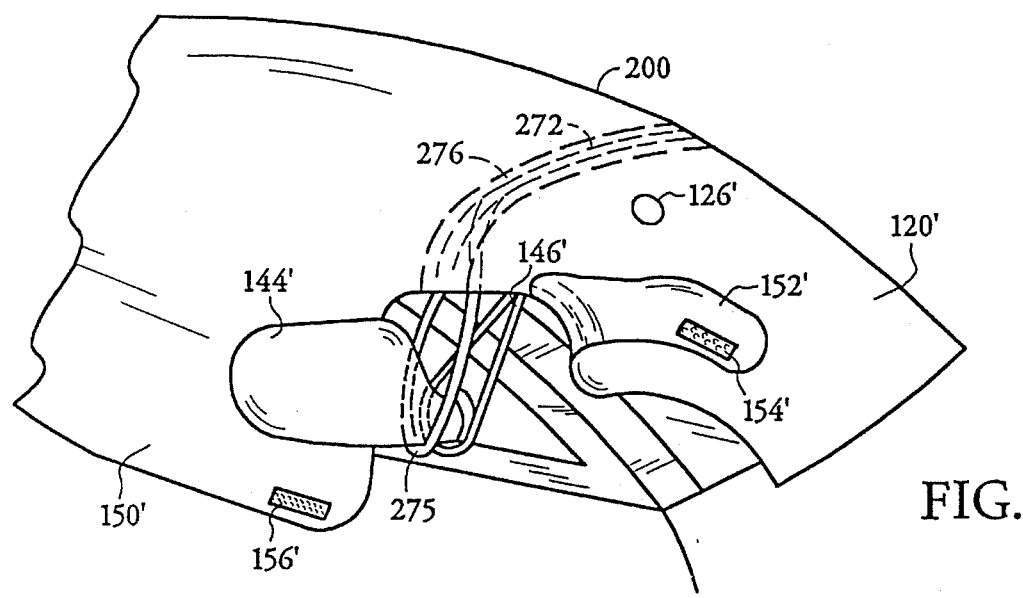
FIG. 4 is a partial schematic perspective view illustrating the attachment of the locking device of FIG. 3 to an outside rearview mirror.

FIG. 4 illustrates securing a second end of security band 272 to the second outside mirror 144'. The second end of security band 272 comprises a closed loop 275 protruding from the second end of sleeve 276 adjacent outside mirror 144'. Loop 275 is fitted around outside mirror 144' after placing elastic strap 146' around this outside mirror. A first end (not shown) of security band 272 has a closed loop (not shown) for receiving the shackle of lock 274. The security band 272 first end protrudes from the first end of sleeve 276 adjacent the first outside mirror 142' (FIG. 3). Security band 272 is pulled taut against the surface of the automobile and is then coiled around outside mirror 142' and subsequently locked in place by locking the loop at the first end of band 272 onto security band 272 in a conventional manner, for example by inserting the lock shackle in this loop and around security band 272.

Figure 5:
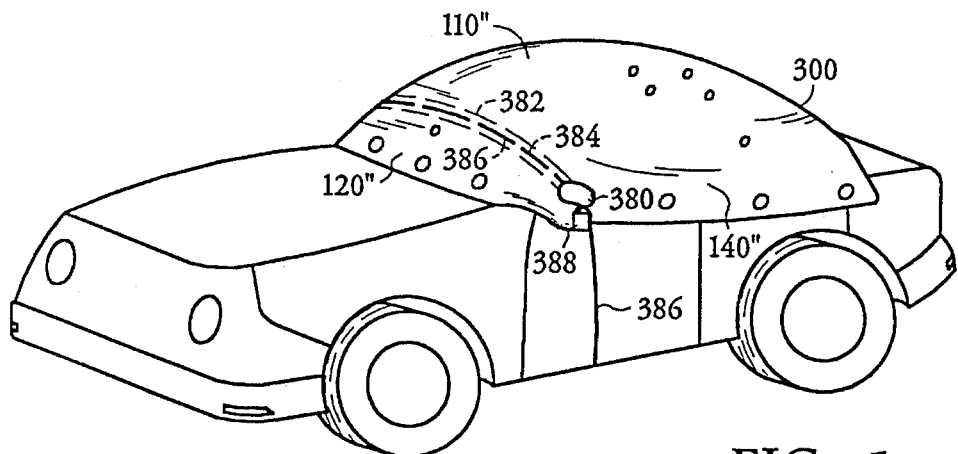
FIG. 5 is a schematic perspective of an additional alternate sunshield of the current invention using a locking device.

FIG. 5 illustrates an additional alternate embodiment of the present invention adapted for use with automobiles having only one outside rearview mirror 380. Sleeve 382 extends along the inside surface of sunshield 300 in a manner similar to sleeve 276 described in connection with FIG. 3. The second end (not shown) of sleeve 382 extends to the perimeter of second side portion 150" (not shown) of sunshield 300. Locking device 384 comprises a security band 386 and a conventional lock 388. The first end of security band 386 has a closed loop (not shown) for receiving a lock shackle. The second end of security band 386 has a loop (not shown) for fitting around an outside mirror similar to loop 275 shown in FIG. 4. Security band 386 comprises a first portion for slidably fitting inside sleeve 382 and a second portion extending along the bottom and both sides of the vehicle whereby security band 386 encircles the car.

The loop at the second end of security band 386 protrudes from the first end of sleeve 382 adjacent outside mirror 380 and is fitted around this mirror in a manner similar to loop 275 around mirror 144' (FIG. 4). Returning to FIG. 5, the first end of security band 386 is pulled taut around the vehicle and is secured to mirror 380 by coiling band 386 around mirror 380 and then locking the loop at the first end of security band 386 to security band 386 by means of lock 388 in a conventional manner.

The above embodiments are illustrated using sleeves which are attached to the inside surface of the sunshield. However, the invention is equally operable when using sleeves which are attached to the outside surface of the sunshield. The sleeve material can be the same as the sunshield material. Alternately, the sleeve can consist of a reinforced material.

Figure 6:
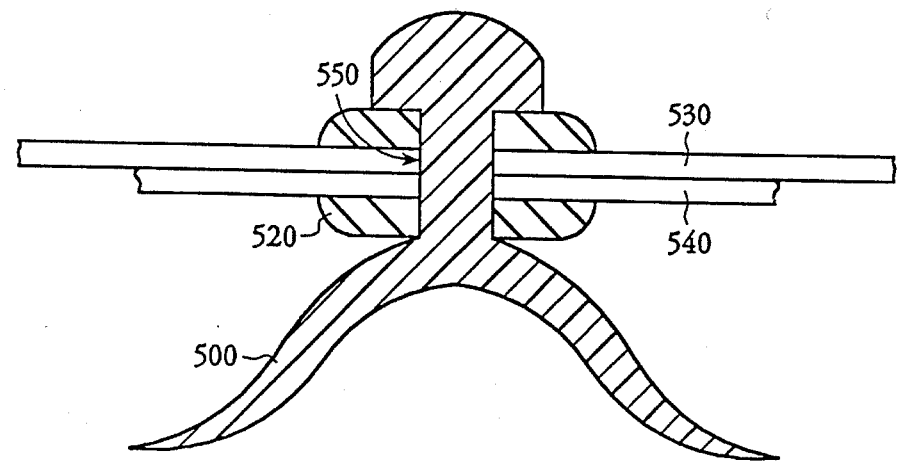
FIG. 6 is a schematic cross-sectional view illustrating the attachment of a suction cup to a sunshield of the present invention.

Preferably, sunshields of the present invention are strengthened with reinforcement straps which are sewn along the perimeter and across the roof portion. These straps can be attached to the inside surface. Alternately, the straps can be sewn on the outside surface using a contrasting color to obtain a visually pleasing effect. Identifying marks such as an automobile license number can be attached to the outside of the sunshield to provide enhanced theft deterrence. Suction cups can be attached to the sunshield according to conventional methods. FIG. 6 illustrates one suitable attachment means for suction cup 500. A grommet 520 is fastened to sunshield material 530 and reinforcement strap 540 near the sunshield perimeter. The grommet is then attached to the neck portion 550 of suction cup 500.

Exterior automobile sunshields of the present invention provide unanticipated improved wind resistance for sunshields covering the roof and window areas of automobiles. The improved wind resistance is believed to be a result of using a combination of: a breathable material, at least five apertures having a diameter of 7/16 inch or less, and at least six suction cups having a diameter of at least 2 inches. At least one aperture is provided in each of the sunshield portions described above as the roof portion, the windshield portion, the rear portion, the first side portion and the second side portion thus providing wind pressure release in every direction.

The unexpected improvement in theft deterrence is provided by a security band attached to a sunshield of the present invention and locked to at least one outside mirror, wherein the security band extends across the inside of the sunshield and is attached to the sunshield at a point which is spaced at least 6 inches from the sunshield perimeter. A thief thus needs to cut the security band or the lock in order to remove the entire sunshield. Cutting the security band or the lock is considerably more difficult than cutting the sunshield material and would be quite obvious to a bystander. A thief can remove most of the sunshield by cutting the fabric along the security band but this means that a significant part of the sunshield will remain attached to the automobile. Known sunshields can be removed almost entirely by cutting the appendages which secure the sunshield to the automobile. Also, sunshields of the present invention do not require a trunk as a sunshield securing means thus making the present invention suitable for many different types of automobiles.

The security band and its attachment to at least one outside mirror provide additional improved wind resistance.

Importantly, sunshields of the present invention are securely fastened to an automobile without the use of fabric members or appendages which are clamped between the automobile body and an articulating member such as a door or a trunk lid, and without fastening the sunshield to a windshield wiper. It is believed that clamping between articulating members can cause damage of the seal between the body and the articulating member thus resulting in a leaking seal. Also, attachment to windshield wipers can result in damaging the windshield wipers when the automobile with the sunshield is exposed to wind.

The invention has been described in terms of the preferred embodiment. One skilled in the art will recognize that it would be possible to construct the elements of the present invention from a variety of means and to modify the placement of components in a variety of ways. While the preferred embodiments have been described in detail and shown in the accompanying drawings, it will be evident that various further modifications are possible without departing from the scope of the invention as set forth in the following claims.

I claim:

1. An exterior automobile sunshield comprising::
a) a flexible breathable material having (1) a predetermined shape, (2) a perimeter along the predetermined shape (3) a windshield portion adapted for covering a windshield of an automobile wherein the windshield portion has a perimeter and one section defining an aperture having a diameter of approximately 3/8 inch, in which the windshield portion aperture is positioned at least 10 inches from the sunshield perimeter, (4) a rear portion adapted for covering a rear window of the automobile wherein the rear portion has a perimeter and one section defining an aperture having a diameter of approximate 3/8 inch, in which the rear portion aperture is positioned at least 10 inches from the sunshield perimeter, (5) a first side portion adapted for covering one or more windows of a first side of the automobile wherein the first side portion has a perimeter and one section defining an aperture having a diameter of approximately 3/8 inch, in which the first side portion aperture is positioned at least 10 inches from the sunshield perimeter, (6) a second side portion adapted for covering one or more windows of a second side of the automobile wherein the second side portion has a perimeter and one section defining an aperture having a diameter of approximately 3/8 inch, in which the second side portion aperture is positioned at least 10 inches from the sunshield perimeter, (7) a roof portion adapted for covering a roof of the automobile wherein the roof portion has four sections each defining an aperture having a diameter of approximately 3/8 inch, in which the four apertures are positioned within a circular area having a diameter of approximately 30 inches and having a center which is approximately equidistant from the windshield portion perimeter, the rear portion perimeter, the first side portion perimeter and the second side portion perimeter, (8) a first side portion perimeter section adapted for fitting a first automobile outside mirror therein, (9) a second side portion perimeter section adapted for fitting a second automobile outside mirror therein, (10) an inside surface for contacting the automobile and (11) an outside surface for exposure to sunlight;
b) a first elastic strap attached to the first outside mirror perimeter section, wherein the first elastic strap is adapted for attaching to the first outside mirror;
second elastic strap attached to the second outside mirror perimeter section wherein the second elastic strap is adapted for attaching to the second outside mirror;
d) six or more suction cups fastened to the sunshield in close proximity to the sunshield perimeter, each suction cup having a diameter ranging from about 2 inches to about 3 inches, wherein the suction cups are spaced approximately equidistant from each other;
e) a sleeve attached to the inside surface of the sunshield wherein the sleeve has (1) a first open end which is positioned at the first side portion perimeter section which is adapted for fitting the first automobile outside mirror therein, (2) a second open end positioned at the second side portion perimeter, (3) a midpoint approximately equidistant between the first open end and the second open end, wherein tile midpoint is spaced at least 6 inches from the sunshield perimeter and (4) a predetermined inside diameter;
f) a security band selected from the group consisting of flexible metal bands, metal wires, metal chains and metal cables, having a first end and a second end wherein the security band is slidably positioned inside the sleeve such that the band first end and the band second end protrude from the sleeve, in which the security band is adapted for locking the sunshield to the automobile; and
g) a padlock for locking the security band onto the automobile.

2. A sunshield according to claim 1 wherein the security band second end is adapted for attachment to the first outside mirror, and the security band first end is adapted for locking onto the first outside mirror.

3. A sunshield according to claim 1 wherein the sleeve second open end is positioned at a second side portion perimeter section which is adapted for fitting a second automobile outside mirror therein.

4. A sunshield according to claim 3 wherein the security band second end is adapted for attachment to the second outside mirror, and the security band first end is adapted for locking onto the first outside mirror.

5. An exterior automobile sunshield comprising:
a) a flexible breathable material having (1) a predetermined shape, (2) a perimeter along the predetermined shape, (3) a roof portion adapted for covering a roof of an automobile, wherein tile roof portion has four sections each defining an aperture having a diameter of approximately 3/8 inch, (4) a windshield portion adapted for covering a windshield of the automobile wherein the windshield portion has a perimeter and a section defining an aperture having a diameter of approximately 3/8 inch which is spaced at least 12 inches from the windshield portion perimeter, (5) a rear portion adapted for covering a rear window of the automobile wherein the rear portion has a perimeter and a section defining an aperture having a diameter of approximately 3/8 inch which is spaced at least 12 inches from tile rear portion perimeter, (6) a first side portion adapted for covering one or more windows of a first side of the automobile, wherein the first side portion has a perimeter and a section defining an aperture having a diameter of approximately 3/8 inch which is spaced at least 12 inches from the first side portion perimeter, (7) a second side portion adapted for covering one or more windows of a second side of the automobile, wherein the second side portion has a perimeter and a section defining an aperture having a diameter of approximately 3/8 inch which is spaced at least 12 inches from the second side perimeter, (8) an inside surface for contacting the automobile and (9) an outside surface for exposure to sunlight;
b) six or more suction cups, each having a diameter of approximately 2½ inch, wherein each suction cup is fastened to the sunshield inside surface in close proximity to the sunshield perimeter, in which the suction cups are spaced approximately equidistant from each other;
c) a sleeve attached to the inside surface of the sunshield having (1) a first open end located at the first side portion perimeter, (2) a second open end located at the second side portion perimeter, (3) a midpoint approximately equidistant from the first end and the second end and spaced at least 10 inches from the windshield portion perimeter and (4) a predetermined inside diameter;
d) a metal cable, slidably positioned inside the sleeve, having (1) a first end protruding from the sleeve first end wherein the metal cable first end is adapted for attachment to a first outside rearview mirror of the automobile, (2) a second end protruding from the sleeve second end wherein the metal cable second end is adapted for attachment to a lock: and e) a padlock for locking the metal cable second end onto a second outside rearview mirror of the automobile.

* * * * *

UNITED STATES PATENT AND TRADEMARK OFFICE
CERTIFICATE OF CORRECTION

PATENT NO. : 5,490,707
DATED : February 13, 1996
INVENTOR(S) : Jose R. De La Cruz It is certified that error appears in the above-indentified patent and that said Letters Patent is hereby corrected as shown below:

Column 1, line 57, change "pans" to --parts--.
Column 7, line 46, before "second" insert --c) a--;
Column 7, line 62, change "tile" to --the--.
Column 8, line 24, change "tile" to --the--;
Column 8, line 37, change "tile" to --the--.

Signed and Sealed this

Second Day of July, 1996

BRUCE LEHMAN

*Attest:*

*Attesting Officer*  Commissioner of Patents and Trademarks